US010669946B2

(12) United States Patent
Sheridan

(10) Patent No.: US 10,669,946 B2
(45) Date of Patent: Jun. 2, 2020

(54) GEARED ARCHITECTURE FOR A GAS TURBINE ENGINE

(71) Applicant: United Technologies Corporation, Hartford, CT (US)

(72) Inventor: William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 934 days.

(21) Appl. No.: 14/731,467

(22) Filed: Jun. 5, 2015

(65) Prior Publication Data

US 2016/0356225 A1 Dec. 8, 2016

(51) Int. Cl.
| | |
|---|---|
| *F02C 3/067* | (2006.01) |
| *B64D 35/06* | (2006.01) |
| *F02C 7/36* | (2006.01) |
| *F02K 3/072* | (2006.01) |
| *F02K 3/06* | (2006.01) |
| *F16H 1/28* | (2006.01) |

(52) U.S. Cl.
CPC ............ *F02C 7/36* (2013.01); *F02K 3/06* (2013.01); *F02K 3/072* (2013.01); *F16H 1/28* (2013.01); *F05D 2220/326* (2013.01); *F05D 2220/327* (2013.01); *F05D 2260/40311* (2013.01)

(58) Field of Classification Search
CPC . F02C 3/067; F05D 2260/40311; B64D 35/06
See application file for complete search history.

(56) References Cited

U.S. PATENT DOCUMENTS

| | | | |
|---|---|---|---|
| 2,801,518 A | 8/1957 | Wosika et al. | |
| 3,290,878 A | 12/1966 | Wickman | |
| 3,729,957 A | 5/1973 | Petrie et al. | |
| 4,005,575 A | 2/1977 | Scott et al. | |
| 4,251,987 A | 2/1981 | Adamson | |
| 4,817,382 A * | 4/1989 | Rudolph ............... | F02C 3/067 416/129 |
| 4,827,712 A | 5/1989 | Coplin | |

(Continued)

FOREIGN PATENT DOCUMENTS

| | | |
|---|---|---|
| EP | 1777406 | 4/2007 |
| EP | 1881176 | 1/2008 |

(Continued)

OTHER PUBLICATIONS

International Search Report and Written Opinion for International Application No. PCT/US2013/033960 dated Jan. 16, 2014.

(Continued)

*Primary Examiner* — Tisha D Lewis
(74) *Attorney, Agent, or Firm* — Carlson, Gaskey & Olds, P.C.

(57) ABSTRACT

A gear system for a gas turbine engine includes a planet gear system which includes an output attached to a carrier for rotating a first fan assembly in a first direction. A star gear system includes an output attached to a ring gear for rotating a second fan assembly in a second direction. A sun gear of the star gear system is mechanically attached to a sun gear of the planet gear system.

23 Claims, 2 Drawing Sheets

(56) References Cited

U.S. PATENT DOCUMENTS

| | | | |
|---|---|---|---|
| 4,964,844 A * | 10/1990 | Bagnall | B64C 11/48 |
| | | | 475/295 |
| 4,976,102 A | 12/1990 | Taylor | |
| 5,009,621 A * | 4/1991 | Bankstahl | B63H 5/10 |
| | | | 416/129 |
| 5,010,729 A | 4/1991 | Adamson et al. | |
| 5,137,425 A | 8/1992 | Rohra et al. | |
| 5,274,999 A | 1/1994 | Rohra et al. | |
| 5,279,109 A | 1/1994 | Liu et al. | |
| 5,472,383 A | 12/1995 | McKibbin | |
| 5,806,303 A | 9/1998 | Johnson | |
| 6,033,450 A | 3/2000 | Krul et al. | |
| 6,381,948 B1 | 5/2002 | Klingels | |
| 6,732,502 B2 | 5/2004 | Seda et al. | |
| 6,895,741 B2 | 5/2005 | Rago et al. | |
| 6,901,739 B2 | 6/2005 | Christopherson | |
| 7,513,103 B2 | 4/2009 | Orlando et al. | |
| 7,752,836 B2 | 7/2010 | Orlando et al. | |
| 7,788,898 B2 | 9/2010 | Kern et al. | |
| 7,841,165 B2 | 11/2010 | Orlando et al. | |
| 7,845,157 B2 | 12/2010 | Suciu et al. | |
| 7,883,315 B2 | 2/2011 | Suciu et al. | |
| 7,926,259 B2 | 4/2011 | Orlando et al. | |
| 7,937,927 B2 | 5/2011 | Suciu et al. | |
| 7,959,406 B2 | 6/2011 | Suciu et al. | |
| 8,061,968 B2 | 11/2011 | Merry et al. | |
| 8,075,261 B2 | 12/2011 | Merry et al. | |
| 8,096,753 B2 | 1/2012 | Norris et al. | |
| 8,104,257 B2 | 1/2012 | Norris et al. | |
| 8,205,432 B2 | 6/2012 | Sheridan | |
| 8,667,688 B2 | 3/2014 | McCune et al. | |
| 9,017,028 B2 * | 4/2015 | Fabre | B64C 11/48 |
| | | | 416/128 |
| 2005/0241291 A1 | 11/2005 | Bart et al. | |
| 2006/0059970 A1 | 3/2006 | Scott et al. | |
| 2006/0236675 A1 | 10/2006 | Weiler | |
| 2007/0205321 A1 | 9/2007 | Waide | |
| 2008/0020891 A1 | 1/2008 | Beaven | |
| 2008/0120839 A1 | 5/2008 | Schilling | |
| 2008/0148707 A1 | 6/2008 | Schilling | |
| 2009/0000265 A1 | 1/2009 | Kupratis | |
| 2009/0000271 A1 | 1/2009 | Kupratis | |
| 2009/0071121 A1 | 3/2009 | Suciu et al. | |
| 2009/0074565 A1 | 3/2009 | Suciu et al. | |
| 2009/0090096 A1 | 4/2009 | Sheridan | |
| 2009/0145102 A1 | 6/2009 | Roberge et al. | |
| 2009/0148276 A1 | 6/2009 | Suciu et al. | |
| 2009/0169385 A1 | 7/2009 | Suciu et al. | |
| 2009/0288421 A1 | 11/2009 | Zeiner et al. | |
| 2009/0293445 A1 | 12/2009 | Ress, Jr. | |
| 2010/0005778 A1 | 1/2010 | Chaudhry | |
| 2010/0024434 A1 | 2/2010 | Moore et al. | |
| 2010/0126141 A1 | 5/2010 | Schilling | |
| 2010/0192595 A1 | 8/2010 | Orlando et al. | |
| 2010/0223904 A1 | 9/2010 | Edwards | |
| 2011/0056208 A1 | 3/2011 | Norris et al. | |
| 2011/0206498 A1 | 8/2011 | McCooey | |
| 2012/0088624 A1 | 4/2012 | Sheridan | |
| 2013/0000314 A1 * | 1/2013 | McCaffrey | F01D 13/003 |
| | | | 60/773 |
| 2013/0223983 A1 * | 8/2013 | Suciu | F02C 3/107 |
| | | | 415/68 |
| 2013/0340406 A1 * | 12/2013 | Gallagher | F01D 5/141 |
| | | | 60/204 |
| 2014/0045645 A1 | 2/2014 | McCune et al. | |
| 2014/0196473 A1 | 7/2014 | Kupratis et al. | |
| 2015/0011354 A1 * | 1/2015 | Fabre | B64D 35/04 |
| | | | 475/331 |

FOREIGN PATENT DOCUMENTS

| | | | |
|---|---|---|---|
| EP | 2 199 568 | 6/2010 | |
| EP | 2360391 | 8/2011 | |
| FR | 847990 A * | 10/1939 | B64D 35/06 |
| GB | 579820 | 8/1946 | |
| GB | 891 064 | 3/1962 | |
| GB | 1 097 632 | 1/1968 | |
| GB | 2493834 | 2/2013 | |
| WO | 2006 059981 | 6/2006 | |
| WO | 2006 059992 | 6/2006 | |
| WO | 2008 082336 | 7/2008 | |
| WO | 2014031197 | 2/2014 | |

OTHER PUBLICATIONS

European Search Report for European Application No. 13877780.0 dated Apr. 29, 2015.

International Search Report for PCT Application No. PCT/US2013/034062, dated Jun. 28, 2013.

International Preliminary Report on Patentability for PCT Application No. PCT/US2013/034062, dated Oct. 16, 2014.

Extended European Search Report for European Application No. 16172633.6 dated Oct. 31, 2016.

* cited by examiner

GEARED ARCHITECTURE FOR A GAS TURBINE ENGINE

BACKGROUND

Turbomachines, such as gas turbine engines, typically include a fan section, a turbine section, a compressor section, and a combustor section. Turbomachines may employ a geared architecture connecting the fan section and the turbine section. The compressor section typically includes at least a high-pressure compressor and a low-pressure compressor. The compressors include rotors that rotate separately from a rotor of fan. To maximize performance of such turbomachines, various recent engine architectures have been proposed in which the fan rotates in a first direction and at a first speed as compared to a low pressure compressor which rotates in the opposite direction and at a higher speed. These recent engine architectures can also be improved.

SUMMARY

In one exemplary embodiment, a gear system for a gas turbine engine includes a planet gear system which includes an output attached to a carrier for rotating a first fan assembly in a first direction. A star gear system includes an output attached to a ring gear for rotating a second fan assembly in a second direction. A sun gear of the star gear system is mechanically attached to a sun gear of the planet gear system.

In a further embodiment of the above, a ring gear of the planet gear system and a carrier of the star gear system are rigidly fixed to a static structure.

In a further embodiment of any of the above, a ring gear of the planet gear system and a carrier of the star gear system are formed as part of a cylindrically shaped static structure.

In a further embodiment of any of the above, an input to the sun gear of the planet gear system is rigidly fixed to the sun gear of the star gear system.

In a further embodiment of any of the above, the sun gear of the planet gear system and the sun gear of the star gear system include an equal number of teeth.

In a further embodiment of any of the above, there is a static structure for supporting the first fan assembly on a radially inner side and the second fan assembly on a radially outer side.

In a further embodiment of any of the above, a reduction ratio of the planet gear system is approximately 3.0:1 and a reduction ratio of the star gear system is approximately 3.0:1.

In a further embodiment of any of the above, a reduction ratio of the planet gear system is exactly equal to the reduction ratio of the star gear system and the reduction ratio can vary from 2.7:1 to 3.3:1.

In a further embodiment of any of the above, a reduction ratio of the planet gear system is not equal to the reduction ratio of the star gear system and the reduction ratio of the planet gear system can vary from 2.7:1 to 3.3:1 and the reduction ratio of the star gear system can vary from 2.7:1 to 3.3:1.

In another exemplary embodiment, a gas turbine engine includes a fan drive shaft mechanically attached to a sun gear of a planet gear system and a sun gear of a star gear system. A first fan assembly is driven by an output attached to a carrier of the planet gear system. A second fan assembly is driven by an output attached to a ring gear of the star gear system. The sun gear of the star gear system is mechanically attached to the star gear of the planet gear system.

In a further embodiment of any of the above, a ring gear of the planet gear system and a carrier of the star gear system are rigidly fixed to an engine static structure.

In a further embodiment of any of the above, a ring gear of the planet gear system and a carrier of the star gear system are formed as part of a cylindrically shaped static structure.

In a further embodiment of any of the above, an engine static structure supports the first fan assembly on a radially inner side and the second fan assembly on a radially outer side.

In a further embodiment of any of the above, the engine static structure forms a cylindrical body and extends between the first fan assembly and the second fan assembly.

In a further embodiment of any of the above, a ring gear of the planet gear system and a carrier of the star gear system are formed as part of a cylindrically shaped static structure.

In a further embodiment of any of the above, a reduction ratio of the planet gear system is approximately 3.0:1 and a reduction ratio of the star gear system is approximately 3.0:1.

In a further embodiment of any of the above, a reduction ratio of the planet gear system is exactly equal to the reduction ratio of the star gear system and the reduction ratio can vary from 2.7:1 to 3.3:1.

In a further embodiment of any of the above, a reduction ratio of the planet gear system is not equal to the reduction ratio of the star gear system. The reduction ratio of the planet gear system can vary from 2.7:1 to 3.3:1. The reduction ratio of the star gear system can vary from 2.7:1 to 3.3:1.

In a further embodiment of any of the above, the first fan assembly includes a fan pressure ratio of 1.2 and the second fan assembly includes a fan pressure ratio of 1.2.

In a further embodiment of any of the above, the fan bypass ratio of the first fan assembly and the second fan assembly is 12.

In another exemplary embodiment, a method of operating a gas turbine engine includes driving a fan drive shaft in a first rotational direction to turn a sun gear of a planet gear system and a sun gear of a star gear system. A first fan blade assembly attached to a carrier of the planet gear system is rotated in the first rotational direction. A second fan blade assembly attached to a ring gear of a star gear system is driven in a second rotational.

In a further embodiment of any of the above, a low pressure compressor is rotated with the second fan blade assembly.

In a further embodiment of any of the above, a first swirl on an airflow is imparted with the first fan blade assembly and a second swirl on the airflow is imparted with the second fan blade assembly. The second swirl counteracts the first swirl.

In a further embodiment of any of the above, the carrier of the planet gear system is rigidly fixed to the ring gear of the star gear system.

DETAILED DESCRIPTION

Figure 1:
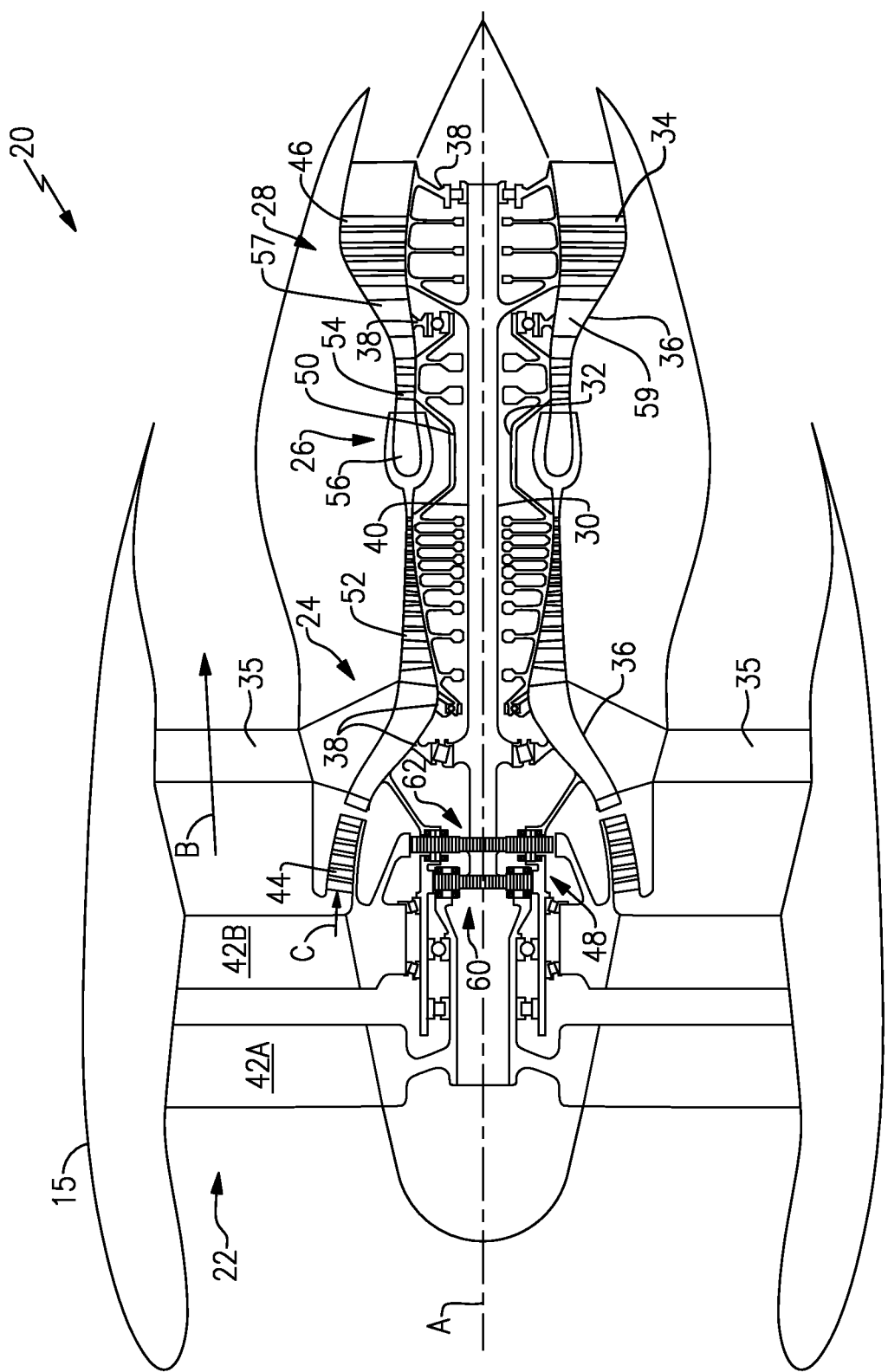
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects the fan section 22, a first (or low) pressure compressor 44 and a first (or low) pressure turbine 46. The inner shaft 40 is connected to the fan section 22 and the low pressure compressor 44 through a speed change mechanism, which in exemplary gas turbine engine 20 is illustrated as a gear system 48 to drive the fan section 22 and the low pressure compressor 44 at a lower speed than the low speed spool 30. In another example, the gear system 48 drives the fan section 22 and the low pressure compressor 44 rotates at the same rotational speed as the inner shaft 40.

The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 may be varied. For example, the gear system 48 may be located aft of aft of the low pressure compressor section 44.

The engine 20 in one example is a high-bypass geared aircraft engine. In a further example, the engine 20 bypass ratio is greater than about six (6), with an example embodiment being greater than about ten (10), and the low pressure turbine 46 has a pressure ratio that is greater than about five. In one disclosed embodiment, the engine 20 bypass ratio is greater than about ten (10:1), a fan diameter of a first fan blade assembly 42A and second fan blade assembly 42B is significantly larger than that of the low pressure compressor 44, and the low pressure turbine 46 has a pressure ratio that is greater than about five 5:1. In the illustrated example, the first and second fan blade assemblies 42A, 42B are ducted fans. Low pressure turbine 46 pressure ratio is pressure measured prior to inlet of low pressure turbine 46 as related to the pressure at the outlet of the low pressure turbine 46 prior to an exhaust nozzle.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The example gas turbine engine 20 includes the fan section 22 that comprises in one non-limiting embodiment of the example gas turbine engine 20, the first fan blade assembly 42A and the second fan blade assembly 42B. Each of the first and second fan blade assemblies 42A, 42B include less than about twenty-six (26) fan blades. In another non-limiting embodiment, the first and second fan blade assemblies 42A, 42B each include less than about twenty (20) fan blades. Moreover, in one disclosed embodiment low pressure turbine 46 includes no more than about six (6) turbine rotors schematically indicated at 34.

In another non-limiting example embodiment low pressure turbine 46 includes about three (3) turbine rotors. A ratio between number of fan blades and the number of low pressure turbine rotors is between about 5.0 and about 15.0. The example low pressure turbine 46 provides the driving power to rotate fan section 22 and therefore the relationship between the number of turbine rotors 34 in low pressure turbine 46 and number of blades in the first fan blade assembly 42A and the second fan blade assembly 42B in fan section 22 disclose an example gas turbine engine 20 with increased power transfer efficiency.

In the illustrated example, the first fan blade assembly 42A and the second fan blade assembly each provide a fan pressure ratio of about 1.2. Therefore, the overall fan pressure ratio of the fan section 22 is about 1.44 (i.e., $1.2^2$). By having the first and second fan blade assemblies 42A, 42B each provide a fan pressure ratio of about 1.2, the first and second fan blade assemblies 42A, 42B will have lower fan blade tip speeds and thus produce less noise than a single fan assembly with a fan pressure ratio of 1.44.

Figure 2:
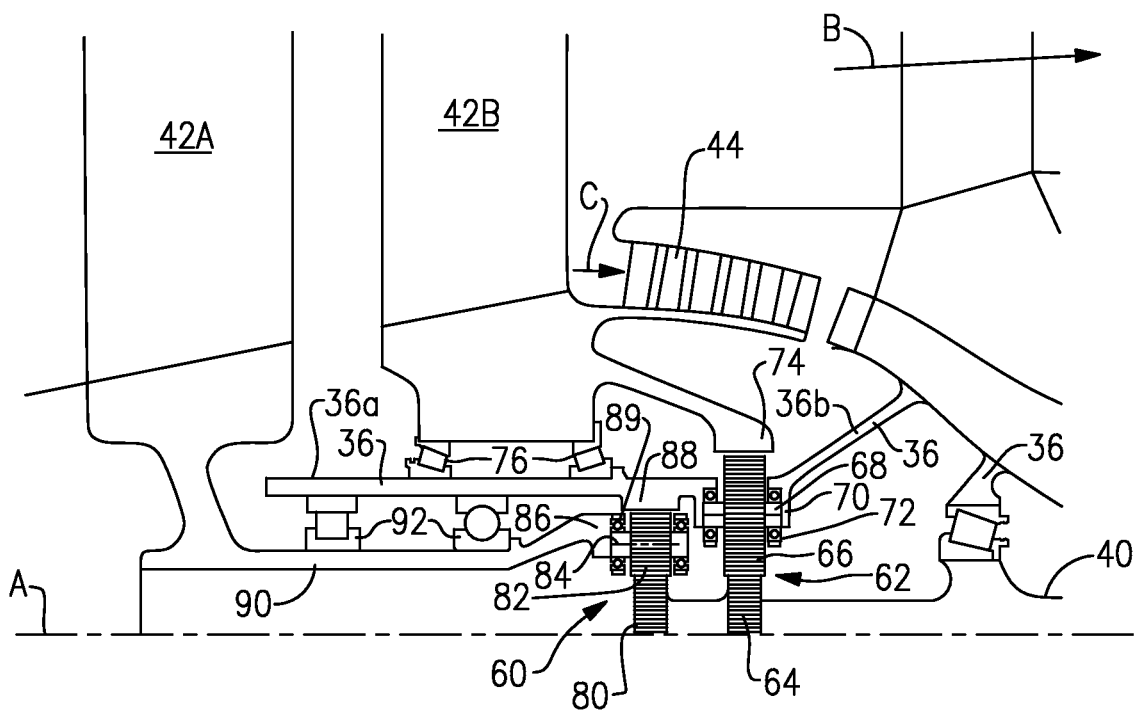
FIG. 2 is an enlarged cross-sectional view of a gear system.

As shown in FIG. 2, the gear system 48 includes a first epicyclic gear train 60 located axially forward of a second epicyclic gear train 62 relative to the axis A of the gas turbine engine 20. In the illustrated example, the first epicyclic gear train 60 is a planet gear system and the second epicyclic gear train 62 is a star gear system.

The second epicyclic gear train 62 includes a sun gear 64 attached to the inner shaft 40. The sun gear 64 meshes with a plurality of star gears 66 spaced radially outward from the sun gear 64. The star gears 66 are each supported on a corresponding shaft 68 extending through a carrier 70. Each of the shafts 68 are rotatably supported by bearings 72 on the carrier 70.

The carrier 70 is attached to the engine static structure 36 such that the carrier 70 is fixed from rotation relative to the engine static structure 36. A ring gear 74 is located radially outward from the star gears 66 and rotates the second fan blade assembly 42B. Because the second epicyclic gear train 62 is a star gear system, the ring gear 74 rotates in an opposite direction from the sun gear 64 and rotates the second fan blade assembly 42B and the low pressure compressor 44. The second fan blade assembly 42B is supported by bearings 76 attached to the engine static structure 36. In the illustrated example, the bearings 76 are tapered bearings, however, other types of bearings such as roller bearings and ball bearings could be used.

The first epicyclic gear train 60 includes a sun gear 80 rotatably attached to the inner shaft 40. In another example, the sun gears 64 and 80 could be a single sun gear extending between the first epicyclic gear train 60 and the second epicyclic gear train 62. The sun gear 80 meshes with planet gears 82 spaced radially outward from the sun gear 80. The planet gears 82 are each supported on a corresponding shaft 84 extending through a carrier 86. The shafts 84 are rotatably supported by bearings 89 on the carrier 86. A ring gear 88 is located radially outward from the planet gears 82 and is fixed from rotation relative to the engine static structure 36. Because the first epicyclic gear train 60 is a planet gear system, the carrier 86 rotates in the same direction as the sun gear 80 and inner shaft 40.

The carrier 86 is attached to a fan drive shaft 90 to turn the first fan blade assembly 42A. The fan drive shaft 90 is supported by the engine static structure 36 by bearings 92. In the illustrated example, the bearings 92 are roller bearings and ball bearings, however, other types of bearings such as tapered bearings could be used.

In one example, the carrier 70 on the second epicyclic gear train 62 and the ring gear 88 of the first epicyclic gear train 20 are formed integrally with the engine static structure 36. In this example, the engine static structure 36 includes a forward portion 36a forward of the carrier 70 on the second epicyclic gear train 62 and an aft portion 36b downstream of the carrier 70 on the second epicyclic gear train 62. The forward portion 36a and the aft portion 36b form a cylindrical extension of the engine static structure 36. The forward portion 36a of the engine static structure 36 supports the second fan blade assembly 42B on a radially outer side on the bearings 76 and the first fan blade assembly 42A on a radially inner side on bearings 92.

As shown in FIGS. 1 and 2, the first gear train 60 extends a first radial dimension to a radially outer side of the star gears and the second epicyclic gear train 62 extends a second radial dimension to a radially outer side of the star gears 66. In one example, the first radial dimension is less than the second radial dimension. In another example, the first radial dimension is equal to the second radial dimension within 10 percent.

In the illustrated example, the first epicyclic gear train 60 includes the same gear reduction ratio as the second epicyclic gear train 62. In other example, the first epicyclic gear train includes a gear ratio within 10% of being identical to the gear ratio of the second epicyclic gear train 62. In one example, the gear reduction ratio of the first epicyclic gear train 60 and the second epicyclic gear train 62 is at least 2.3. In another example, the gear reduction ratio of the first epicyclic gear train 60 and the second epicyclic gear train 62 is 3.0. In yet another example, the gear reduction ratio of the first epicyclic gear train 60 and the second epicyclic gear train 62 is between 2.7 and 3.3.

In one example of the first epicyclic gear train 60, the sun gear 80 includes 60 teeth, the planet gears 82 include 30 teeth, and the ring gear 88 includes 120 teeth. In a corresponding example of the second epicyclic gear train 62, the sun gear 64 includes 60 teeth, the star gears 66 include 60 teeth, and the ring gear 74 includes 180 teeth. The reduction ratio of the first epicyclic gear train 60 is calculated by dividing the number of ring gear 88 teeth by the number of teeth on the sun gear 80 and adding one. The reduction ratio of the second epicyclic gear train 62 is calculated by dividing the number of teeth on the ring gear 74 teeth with the number of teeth on the sun gear 64. With the example number of teeth giving for the first epicyclic gear train and the second epicyclic gear train, the reduction ratios for 3.0:1. Additionally, because the first epicyclic gear train 60 is a planetary gear system in the illustrated example, a radially outer dimension of the first epicyclic gear train 60 will be less than a radially outer dimension of the second epicyclic gear train 62 having the same gear reduction.

The first fan blade assembly 42A imparts a swirl in a first direction and the second fan blade assembly 42B imparts a swirl in a second opposite direction that counteracts the swirl from the first fan blade assembly 42A. Because the swirl from the first and second fan blade assemblies 42A, 42B counteract each other, struts 35 are only needed support the core engine and do not need to counteract swirl of the bypass airflow B. Fewer struts 35 can also be used when the struts 35 are not needed to counteract swirl from a single fan.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gear system for a gas turbine engine comprising:
   a planet gear system including an output attached to a carrier for rotating a first fan assembly in a first direction;
   a star gear system including an output attached to a ring gear for rotating a second fan assembly in a second direction, wherein a sun gear of the star gear system is mechanically attached to a sun gear of the planet gear system and the first fan assembly is axially forward of the second fan assembly.

2. The gear system of claim 1, wherein a ring gear of the planet gear system and a carrier of the star gear system are rigidly fixed to a static structure.

3. The gear system of claim 1, wherein a ring gear of the planet gear system and a carrier of the star gear system are formed as part of a cylindrically shaped static structure.

4. The gear system of claim 1, wherein an input to the sun gear of the planet gear system is rigidly fixed to the sun gear of the star gear system and the input is configured to rotate at the same speed as a low pressure turbine.

5. The gear system of claim 1, wherein the sun gear of the planet gear system and the sun gear of the star gear system include an equal number of teeth.

6. The gear system of claim 3, wherein the cylindrical shaped static structure includes at least one first bearing assembly on a radially inner side of the cylindrical shaped static structure for supporting the first fan assembly and at least one second bearing assembly located on a radially outer side of the cylindrical shaped static structure for supporting the second fan assembly.

7. The gear system of claim 1, wherein a reduction ratio of the planet gear system is approximately 3.0:1 and a reduction ratio of the star gear system is approximately 3.0:1.

8. The gear system of claim 1, wherein a reduction ratio of the planet gear system is exactly equal to the reduction ratio of the star gear system and the reduction ratio can vary from 2.7:1 to 3.3:1.

9. The gear system of claim 1, wherein a reduction ratio of the planet gear system is not equal to the reduction ratio of the star gear system and the reduction ratio of the planet gear system can vary from 2.7:1 to 3.3:1 and the reduction ratio of the star gear system can vary from 2.7:1 to 3.3:1.

10. A gas turbine engine comprising:
    an inner shaft mechanically attached to a sun gear of a planet gear system and a sun gear of a star gear system, wherein the inner shaft rotates with the sun gear of the planet gear system and the sun gear of the star gear system;
    a first fan assembly driven by an output attached to a carrier of the planet gear system; and
    a second fan assembly driven by an output attached to a ring gear of the star gear system, wherein the sun gear of the star gear system is mechanically attached to the sun gear of the planet gear system, wherein a ring gear of the planet gear system and a carrier of the star gear system are formed as part of a cylindrically shaped static structure and the first fan assembly is axially forward of the second fan assembly.

11. The gas turbine engine of claim 10, wherein the ring gear of the planet gear system and the carrier of the star gear system are rigidly fixed to an engine static structure.

12. The gas turbine engine of claim 10, comprising an engine static structure for supporting the first fan assembly on a radially inner side and the second fan assembly on a radially outer side.

13. The gas turbine engine of claim 12, wherein the engine static structure forms a cylindrical body extending between the first fan assembly and the second fan assembly and the cylindrical body includes at least one first bearing assembly on a radially inner side of the cylindrical body for supporting the first fan assembly and at least one second bearing assembly located on a radially outer side of the cylindrical body for supporting the second fan assembly.

14. The gas turbine engine of claim 13, wherein the ring gear of the planet gear system and the carrier of the star gear system are formed as part of a cylindrically shaped static structure.

15. The gas turbine engine of claim 10, wherein a reduction ratio of the planet gear system is approximately 3.0:1 and a reduction ratio of the star gear system is approximately 3.0:1.

16. The gas turbine engine of claim 10 wherein a reduction ratio of the planet gear system is exactly equal to the reduction ratio of the star gear system and the reduction ratio can vary from 2.7:1 to 3.3:1.

17. The gas turbine engine of claim 10 wherein a reduction ratio of the planet gear system is not equal to the reduction ratio of the star gear system and the reduction ratio of the planet gear system can vary from 2.7:1 to 3.3:1 and the reduction ratio of the star gear system can vary from 2.7:1 to 3.3:1.

18. The gas turbine engine of claim 10, wherein the first fan assembly includes a fan pressure ratio of 1.2 and the second fan assembly includes a fan pressure ratio of 1.2.

19. The gas turbine engine of claim 10, wherein the fan bypass ratio of the first fan assembly and the second fan assembly is 12.

20. A method of operating a gas turbine engine comprising:
    driving an inner shaft in a first rotational direction to turn a sun gear of a planet gear system and a sun gear of a star gear system, wherein the sun gear of the planet gear system and the sun gear of the star gear system rotate at the same speed as a low pressure turbine;
    rotating a first fan blade assembly attached to a carrier of the planet gear system in the first rotational direction; and
    driving a second fan blade assembly attached to a ring gear of the star gear system in a second rotational direction.

21. The method of claim 20, including rotating a low pressure compressor with the second fan blade assembly and the first fan assembly is axially forward of the second fan assembly.

22. The method of claim 20, including imparting a first swirl on an airflow with the first fan blade assembly and imparting a second swirl on the airflow with the second fan blade assembly, wherein the second swirl counteracts the first swirl.

23. The method of claim 20, wherein a ring gear of the planet gear system is rigidly fixed to a carrier of the star gear system and an engine static structure forms a cylindrical body extending between the first fan assembly and the second fan assembly and the cylindrical body includes at least one first bearing assembly on a radially inner side of the cylindrical body for supporting the first fan assembly and at least one second bearing assembly located on a radially outer side of the cylindrical body for supporting the second fan assembly.

* * * * *